United States Patent
Martin et al.

(10) Patent No.: US 11,208,512 B2
(45) Date of Patent: Dec. 28, 2021

(54) BIMODAL POLYETHYLENE RESINS

(71) Applicant: Univation Technologies, LLC, Houston, TX (US)

(72) Inventors: Peter S. Martin, Houston, TX (US); John F. Szul, S. Charleston, WV (US); Roger L. Kuhlman, Freeport, TX (US); Mahsa McDougal, Freeport, TX (US); C. Jeff Harlan, Houston, TX (US); Timothy M. Boller, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 266 days.

(21) Appl. No.: 16/485,610

(22) PCT Filed: Jan. 12, 2018

(86) PCT No.: PCT/US2018/013486
§ 371 (c)(1),
(2) Date: Aug. 13, 2019

(87) PCT Pub. No.: WO2018/147968
PCT Pub. Date: Aug. 16, 2018

(65) Prior Publication Data
US 2020/0048384 A1   Feb. 13, 2020

Related U.S. Application Data

(60) Provisional application No. 62/458,077, filed on Feb. 13, 2017.

(51) Int. Cl.
*C08F 210/16*   (2006.01)
*C08F 4/6592*   (2006.01)
*B29C 49/00*   (2006.01)

(52) U.S. Cl.
CPC .......... *C08F 210/16* (2013.01); *C08F 4/6592* (2013.01); *B29C 49/0005* (2013.01)

(58) Field of Classification Search
CPC .............................. C08F 210/16; C08F 10/02
See application file for complete search history.

(56) References Cited

U.S. PATENT DOCUMENTS

| | | | |
|---|---|---|---|
| 6,194,520 B1 | 2/2001 | Cheruvu et al. | |
| 6,525,148 B1 * | 2/2003 | McDaniel | C08F 10/00 526/108 |
| 7,858,702 B2 | 12/2010 | Jaker | |
| 8,318,883 B1 | 11/2012 | Yang et al. | |

(Continued)

FOREIGN PATENT DOCUMENTS

| JP | 2004307665 A | * 11/2004 | |
|---|---|---|---|
| WO | 2016168700 | 10/2016 | |
| WO | WO-2020028059 A1 | * 2/2020 | ............ C08F 210/16 |

OTHER PUBLICATIONS

International Preliminary Report on Patentability for related PCT Application PCT/US2018/013486, dated Aug. 22, 2019 (8 pgs).

(Continued)

*Primary Examiner* — Michael M Dollinger
(74) *Attorney, Agent, or Firm* — Brooks, Cameron & Huebsch, PLLC

(57) ABSTRACT

A high density, high polydispersity polyethylene having improved properties, and a process of producing same.

8 Claims, 1 Drawing Sheet

GPC Overlay

(56) References Cited

U.S. PATENT DOCUMENTS

| | | | |
|---|---|---|---|
| 9,102,821 B2 * | 8/2015 | Yang | ................ C08F 10/00 |
| 9,169,337 B2 | 10/2015 | Rohatgi et al. | |
| 9,175,111 B2 | 11/2015 | Kapur et al. | |
| 9,273,170 B2 | 3/2016 | Hlavinka et al. | |
| 9,394,393 B2 | 7/2016 | Hlavinka et al. | |
| 9,493,589 B1 | 11/2016 | Greco et al. | |
| 9,676,885 B2 | 6/2017 | Pannell et al. | |
| 2010/0133714 A1 | 6/2010 | Jaker et al. | |
| 2016/0032025 A1 | 2/2016 | Giesbrecht | |
| 2020/0123357 A1 * | 4/2020 | Kim | ............. C08F 4/65927 |

OTHER PUBLICATIONS

International Search Report & Written Opinion for related PCT Application PCT/US2018/013486, dated Apr. 20, 2018 (12 pgs).

* cited by examiner

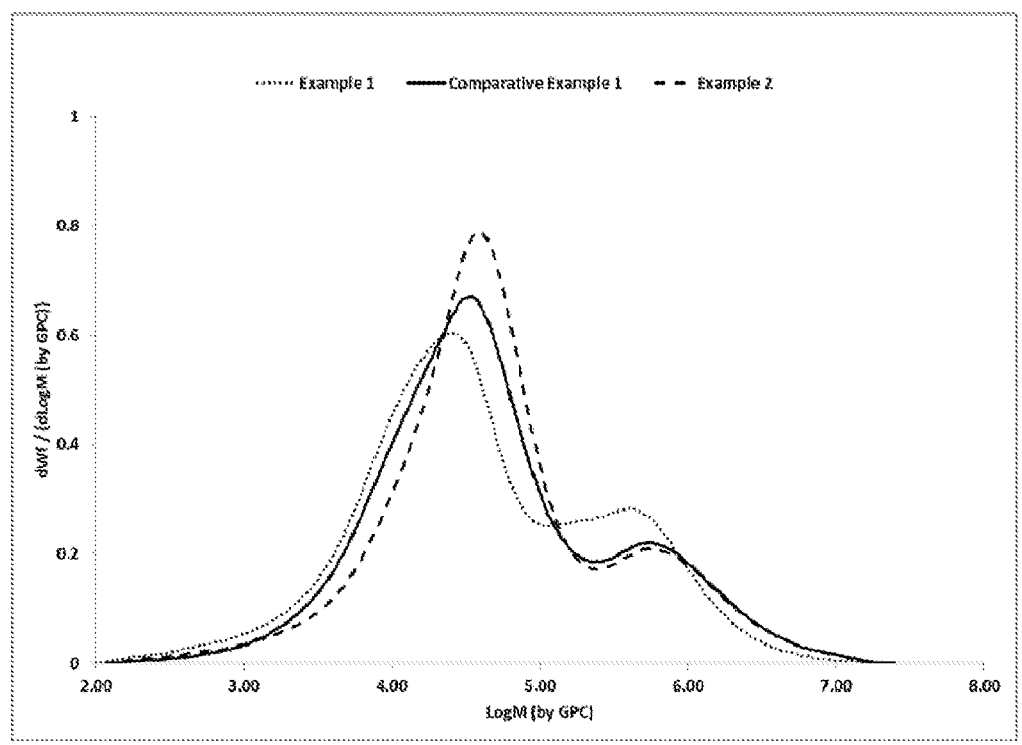

BIMODAL POLYETHYLENE RESINS

This application is a National Stage Application under 35 U.S.C. § 371 of International Application Number PCT/US2018/013486, filed Jan. 12, 2018 and published as WO 2018/147968 on Aug. 16, 2018, which claims the benefit to U.S. Provisional Application 62/458,077, filed Feb. 13, 2017, the entire contents of which are incorporated herein by reference in its entirety.

The field relates generally to polyethylene resins and methods of their production.

BACKGROUND OF THE INVENTION

Polymers may be utilized for a number of products including films, pipes and containers among others. Polymers can be formed by reacting one or more types of monomer in a polymerization reaction. There is continued focus in the industry on developing new and improved materials and/or processes that may be utilized to form polymers for existing and new products.

SUMMARY

While a wide variety of ethylene-based polymers are known, and many are commercially available, it would nevertheless be desirable to have improved bimodal resins for use in extrusion blow molding applications, especially resins having greatly improved ESCR compared to first generation resins made by the widely-used UNIPOL process using PRODIGY BMC-300 brand catalyst.

The invention includes such an ethylene-based polymer comprising a higher molecular weight component (HMW component) and a lower molecular weight component (LMW component), the ethylene-based polymer being characterized by a density greater than or equal to 0.949 g/cm$^3$, measured according to ASTM D792, a ratio of Mw/Mn of from 25 to 35, an ESCR of at least 600 hr. measured according to ASTM D-1693, Condition B (Igepal 10%), and by a bimodal weight average molecular weight distribution with a local minimum in a range of log (molecular weight) 4 to 6, or 4.5 to 5.5, between a peak representing the HMW component and a peak representing the LMW component, as determined by Gel Permeation Chromatography (GPC) analysis of the ethylene-based polymer.

The invention also includes a process for copolymerizing ethylene and one or more alpha-olefins in a single olefin polymerization reactor utilizing a metallocene catalyst, activator and support in order to produce an ethylene-based polymer, the process comprising combining ethylene and at least one alpha-olefin comonomer in the presence of a catalyst, an activator and a support, wherein the catalyst comprises a main catalyst and a trim catalyst, wherein the main catalyst comprises bis(2-pentamethylphenylamido) ethyl)zirconium dibenzyl, and wherein the second catalyst comprises at least one of (propylcyclopentadienyl)(1,3-dimethyl-tetrahydroindenyl)zirconium dimethyl and/or (methylcyclopentadienyl)(1-methyl-tetrahydroindenyl)zirconium dimethyl.

In addition, the invention includes a composition comprising bis(2-pentamethylphenylamido)ethyl)zirconium dibenzyl, and at least one of (methylcyclopentadienyl)(1-methyl-tetrahydroindenyl)zirconium dimethyl and (propyl-cyclopentadienyl)(1,3-dimethyl-tetrahydroindenyl)zirconium dimethyl.

Surprisingly, the ethylene-based polymer exhibits significantly improved ESCR and maintains a good balance of properties desirable for blow molding applications.

BRIEF DESCRIPTION OF THE DRAWINGS

FIG. 1 is a plot of the molecular weight distribution for the ethylene-based polymers of Examples 1 and 2 and Comparative Example 1.

DETAILED DESCRIPTION OF THE INVENTION

Before the present compounds, components, compositions, resins, and/or methods are disclosed and described, it is to be understood that unless otherwise indicated this disclosure is not limited to specific compounds, components, compositions, resins, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" may include more than one leaving group, such that the moiety may be substituted with two or more such groups. Similarly, reference to "a halogen atom" as in a moiety "substituted with a halogen atom" may include more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in "HAWLEY'S CONDENSED CHEMICAL DICTIONARY," Thirteenth Edition, John Wiley & Sons, Inc., (1997) (reproduced there with permission from IUPAC), unless otherwise noted.

The term "polyethylene" may refer to a polymer or polymeric resin or composition made of at least 50% ethylene-derived units, or at least 70% ethylene-derived units, or at least 80% ethylene-derived units, or at least 90% ethylene-derived units, or at least 95% ethylene-derived units, or even 100% ethylene-derived units. The polyethylene may thus be a homopolymer or a copolymer, including a terpolymer, having other monomeric units. A polyethylene resin described herein may, for example, include at least one or more other olefin(s) and/or comonomers. Illustrative comonomers may include alpha-olefins including, but not limited to, propylene, 1-butene, 1-pentene, 1-hexene, 1-octene, 1-decene and 4-methyl-1-pentene. Other monomers may include ethacrylate or methacrylate.

The term "bimodal," when used herein to describe a polymer or polymer resin, e.g., polyethylene, may refer to a "bimodal molecular weight distribution." By way of example, a single composition that includes polyolefins with at least one identifiable high molecular weight distribution and polyolefins with at least one identifiable low molecular weight distribution may be considered to be a "bimodal" polyolefin, as that term is used herein. Other than having different molecular weights, the high molecular weight polyolefin and the low molecular weight polyolefin are both polyethylenes but may have different levels of comonomer incorporation.

The term "split" refers to the weight percent (wt %) of the high molecular weight polyethylene component in the bimodal composition. Thus, it describes the relative amount of the high molecular weight component against the low molecular weight component in a bimodal polyethylene composition, including any of the ethylene-based polymer compositions described herein. The weight percent of each component can also be represented by the area of each molecular weight distribution curve that is seen after deconvolution of the overall molecular weight distribution curve. In one or more embodiments, the split of the bimodal polyethylene composition can range from a low of 20 wt %, 25 wt %, 30 wt %, or 32 wt % to a high of 38 wt %, 43 wt %, or 45 wt %. In one or more embodiments, the split of the bimodal polyethylene composition can range from 20 wt % to 45 wt %, or from 23 wt % to 43 wt %. In one or more embodiments, the split of the bimodal polyethylene composition can range from 28 wt % to 43 wt %, 33 wt % to 43 wt %, or 38 wt % to 43 wt %. In one or more embodiments, the split of the bimodal polyethylene composition can range from 21 wt % to 27 wt %, 21 wt % to 32 wt %, or 21 wt % to 37 wt %.

The molecular weight distribution may be measured by Size Exclusion Chromatography (SEC), e.g., GPC, among other techniques. As mentioned herein, weight average molecular weight (Mw), number average molecular weight (Mn) and Mw/Mn (polydispersity) are determined by using High Temperature Gel Permeation Chromatography (PolymerChar GPC-IR).

The Mn, Mw, z-average (Mz), and z+1 average (Mz+1) molecular weights are terms that refer to the molecular weight values for the entire composition, as opposed to that of any individual component, unless specifically noted otherwise. The number average, weight average, z-average, and z+1 average molecular weight values encompass any value as determined by any published method. A preferred method uses any published deconvolution procedure, e.g., any published technique for elucidating each individual polymer component's molecular information in a bimodal polymer. A particularly preferred technique uses a Flory deconvolution, including but not limited to the Flory procedures set forth in U.S. Pat. No. 6,534,604. Any program that incorporates the principles contained in the following reference is useful: P. J. Flory, "Principles of Polymer Chemistry," Cornell University Press, New York 1953. Any computer program capable of fitting an experimental molecular weight distribution with multiple Flory or log-normal statistical distributions is useful. The Flory distribution can be expressed as follows: $Y=A_0(M/M_n)^2$.

In this equation, Y is the weight fraction of polymer corresponding to the molecular species M, Mn is the number average molecular weight of the distribution, and $A_0$ is the weight fraction of the site generating the distribution. Y can be shown to be proportional to the differential molecular weight distribution (DMWD) that is the change in concentration with the change in log-molecular weight. The SEC chromatogram represents the DMWD. Any computer program that minimizes the square of the difference between the experimental and calculated distributions by varying the $A_0$ and Mn for each Flory distribution is preferred. Particularly preferred is any program that can handle up to 9 Flory distributions. A commercially available program, called Excel Solver, offered by Frontline Systems, Inc. at www-.solver.com can be used to perform the minimization. Using this program, special constraints can be placed on the individual Flory distributions that allow one to fit chromatograms of experimental blends and bimodal distributions.

Bimodal distributions can be fit within two individual groups, a low molecular weight component comprising four constrained Flory distributions and a high molecular weight component comprising five constrained Flory distributions, for a total of nine distributions. Each constrained group is characterized by $A_0$ and Mn of the lowest molecular weight component in the group and the ratios $A_0(n)/A_0(I)$ and $Mn(n)/Mn(I)$ for each of the other distributions (n=2, 3, 4, 5). Although the total number of degrees of freedom is the same for the constrained fit as for eight unconstrained Flory distributions, the presence of the constraint is needed to more accurately determine the contribution to the total chromatogram of the individual low molecular weight and high molecular weight components in a bimodal polymer. Once the fitting process is complete, the program then calculates the molecular weight statistics and weight percents of the individual high and low molecular weight components.

In one or more embodiments, the bimodal polyethylene composition has an Mw of from 150,000 to 600,000. In one or more embodiments, the Mw of the bimodal polyethylene composition ranges from a low of 200,000, 225,000, 250,000, 275,000, or 300,000 to a high of 250,000, 300,000, 350,000, 375,000, or 400,000. In one or more embodiments, the bimodal polyethylene composition has an Mw of from 150,000 to 600,000, or from 200,000 to 400,000, or from 225,000 to 375,000, or from 250,000 to 350,000.

Preferably, the bimodal polyethylene composition has an Mz of 1,500,000 Daltons or more. In one or more embodiments, the bimodal polyethylene composition has an Mz of 1,750,000 Daltons or more. In one or more embodiments, the bimodal polyethylene composition has an Mz ranging from 2,000,000 Daltons to 4,000,000 Daltons. In one or more embodiments, the bimodal polyethylene composition has an Mz between 1,800,000 Daltons and 4,000,000 Daltons. In one or more embodiments, the bimodal polyethylene composition has an Mz between 1,900,000 Daltons and 3,000,000 Daltons. In one or more embodiments, the bimodal polyethylene composition has an Mz that ranges from a low of 1,700,000, 1,850,000, 1,950,000, or 2,150,000 to a high of U.S. Pat. Nos. 2,500,000, 2,900,000, 3,100,000, 3,300,000, or 3,500,000.

In one or more embodiments, the bimodal polyethylene composition has an Mz+1 of 4,000,000 Daltons or more, 3,000,000 Daltons or more, or 6,000,000 Daltons or more. In one or more embodiments, the bimodal polyethylene composition has an Mz+1 between 2,000,000 Daltons and 6,000,000 Daltons. In one or more embodiments, the bimodal polyethylene composition has an Mz+1 between 6,000,000 Daltons and 8,000,000 Daltons. In one or more embodiments, the bimodal polyethylene composition has an Mz+1 that ranges from a low of 4,000,000, 5,000,000, or 6,000,000 Daltons to a high of 6,500,000, 7,000,000, or 8,000,000 Daltons.

As disclosed herein bimodal polyethylene resins may comprise a "high molecular weight polyethylene component" ("HMWC") and a "low molecular weight polyethylene component" ("LMWC"). HMWC may refer to the polyethylene component in the bimodal resin that has a higher molecular weight than the molecular weight of at least one other polyethylene component in the same resin. The term "low molecular weight polyethylene component" ("LMWC") refers to the polyethylene component in the resin that has a lower molecular weight than the molecular weight of at least one other polyethylene component in the same resin. In one embodiment of the invention, the Mz/Mw of the high molecular weight component is from 3.5 to 5.

A high molecular weight component may constitute a component forming a part of the bimodal resin that has an Mw of 400,000 or more. The Mw of the high molecular weight polyethylene component may also range from a low of 500,000, 550,000 or 1,100,000 to a high of 700,000, 900,000, 1,200,000, 1,400,000 or 1,600,000.

Density is a physical property that may be determined in accordance with ASTM D 792. Density is expressed as grams per cubic centimeter (g/cc) unless otherwise noted. The polyethylene resin disclosed herein may have a density of from 0.949 g/cc or above, alternatively 0.952 g/cc or above, alternatively 0.954 g/cc or above, alternatively 0.956 g/cc or above, and alternatively still 0.958 g/cc or above. Illustrative ranges of density for the polyethylene resin may be from 0.949 g/cc to 0.963 g/cc, 0.952 g/cc to 0.961 g/cc, 0.954 g/cc to 0.959 g/cc or 0.956 g/cc to 0.959 g/cc.

The term Melt Flow Ratio, or MFR as used herein means the ratio of melt indices. MFR (or I21/I5) is a ratio of I21 (also referred to as flow index or "FI") to I5 where I21 is measured by ASTM-D-1238 (at 190° C., 21.6 kg weight) and I5 is measured by ASTM-D-1238 (at 190° C., 5 kg weight). In one embodiment of the invention, the ethylene-based polymer has a melt flow ratio (I21/I5) in the range from 15 to 45, or from 20 to 40, measured according to ASTM D1238 (I21 and I5 measured at 190° C. and 21.6 kg or 5.0 kg weight respectively), and a flow index (I21) in the range from 15 to 61, or from 20 to 61, or from 20 to 50, or from 25 to 45.

The polyethylene resin may have an FI of from 15 g/10 min to less than or equal to 61 g/10 min. The polyethylene resin may have an FI ranging from a low of 20 g/10 min to a high of 61 g/10 min. The polyethylene resin may have an FI ranging from a low of 20 g/10 min to a high of 50 g/10 min. The polyethylene resin may have an FI ranging from a low of 25 g/10 min to a high of 45 g/10 min.

The polyethylene resins as disclosed herein may be characterized by having a melt flow ratio (MFR or I21/I5) ranging from 15 to 45, or ranging from 20 to 40. The polyethylene resins are bimodal polyethylene resins.

Low temperature notched Charpy impact testing is performed in accordance with ISO 179 at −40° C. and is reported in kJ/m$^2$. The polyethylene resin may have a low temperature notched Charpy impact greater than 6.0 kJ/m$^2$, or greater than 7.0 kJ/m$^2$, or greater than 8.0 kJ/m$^2$.

The polyethylene resin may have a melt strength greater than or equal to 7.0 cN, or greater than 8.0 cN, or greater than 9.0 cN, or greater than 10.0 cN. The polyethylene resin may also have a melt strength from 7.0 cN to 15.0 cN, or from 8.0 cN to 12.0 cN.

ESCR testing is performed in accordance with ASTM D-1693 Procedure B, and is reported as $F_{50}$ hours using 10% Igepal CO-630 nonionic surfactant solution at 50° C. $F_{50}$ denotes the number of hours at which 50% of the tested specimen exhibits stress cracks. The specific specimen dimensions are 38 mm×13 mm with a thickness of 1.90 mm. The polyethylene resin advantageously has an ESCR of at least 600 hours, or at least 650 hours, at least 800 hours, or at least 1,000 hours. The polyethylene resin may have an ESCR ranging from 600 hours to greater than 1,000 hours, or from 650 hours to greater than 1,000 hours.

Adjusting the in-reactor ratio of catalyst compounds of the catalyst system as well as the hydrogen to ethylene ratio may be used to tailor polyethylene resin MFR and control or target flow index (FI) of the resin. Furthermore, selection of the polymerization reaction temperature may additionally be used to tailor the MFR.

In addition to the hydrogen to ethylene ratio, the comonomer to ethylene ratio may also have an impact on MFR characteristics of the resulting polymer. The method of tailoring the polyethylene resin may further include determining a comonomer to ethylene ratio range to produce the polyethylene resin having a desired flow index, a desired density, a desired molecular weight distribution, or any combination thereof, and operating the reactor within the determined range. The comonomer to ethylene ratio may then be selected, in conjunction with the hydrogen to ethylene ratio to tailor the MFR characteristics of the resulting polyethylene.

The polyethylene resins may be characterized by having a bimodal molecular weight distribution including: at least 20%, e.g. 20-50%, by weight of a high molecular weight component having an Mn in the range from 80,000 to 180,000 and an Mw in the range from 400,000 to 900,000; and a low molecular weight component having an Mn in the range from 4,000 to 13,000 and an Mw in the range from 15,000 to 60,000.

The term "swell," as used herein, refers to the enlargement of the cross sectional dimensions, with respect to the die dimensions, of the ethylene-based polymer melt as it emerges from the die. This phenomenon, also known as "Barus effect," is widely accepted to be a manifestation of the elastic nature of the melt, as it recovers from the deformations it has experienced during its flow into and through the die. For blow molding applications, the swell of the parison may be described by the enlargement of its diameter ("flare swell") or of its cross-sectional area ("weight swell") compared to the respective dimensions of the annular die itself.

As mentioned herein, "swell" will be described in terms of Capillary, or Extrudate, Swell. The swell of a polyethylene resin, produced using a catalyst system as disclosed herein, may be tailored during the polymerization process by properly targeting or adjusting the hydrogen to ethylene ratio. For example, a polyethylene having tailored swell characteristics may be produced by feeding a catalyst system, hydrogen, and ethylene to a polymerization reactor, and adjusting the hydrogen to ethylene ratio to produce a polyethylene resin having a desired swell.

To aid in tailoring of the swell characteristics, a hydrogen to ethylene ratio range that may be used to produce a polyethylene resin having a desired flow index or desired molecular weight distribution using the catalyst system may be determined. Swell characteristics of the resins over the hydrogen to ethylene ratio range may also be determined. In one embodiment of the invention, the ethylene-based polymer has a Capillary Swell t1000 (sec) of at least 6. Additionally, adjusting the in-reactor ratio of catalyst compounds of the catalyst system as well as the hydrogen to ethylene ratio may be used to tailor polyethylene resin swell and control or target flow index (FI) of the resin.

In addition to the hydrogen to ethylene ratio, the comonomer to ethylene ratio may also have an impact on swell characteristics of the resulting polymer. The method of tailoring the polyethylene resin may further include determining a comonomer to ethylene ratio range to produce the polyethylene resin having a desired flow index, a desired density, a desired molecular weight distribution, or any combination thereof, and operating the reactor within the determined range. The comonomer to ethylene ratio may then be selected, in conjunction with the hydrogen to ethylene ratio to tailor the swell characteristics of the resulting polyethylene.

While use of relative terms, such as greater than, less than, upper, and lower, are used above to describe aspects of the swell characteristics, component weight, hydrogen to ethylene ratio, etc., such terms are used relative to one another or comparatively, and are thus readily understandable to those of ordinary skill in the art with respect to the metes and bounds inferred by use of such terms.

As used herein, structural formulas are employed as is commonly understood in the chemical arts; lines ("—") used to represent associations between a metal atom ("M", Group 3 to Group 12 atoms) and a ligand, ligand atom or atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound."

The catalyst systems as disclosed herein may allow for the production of polymers having bimodal resin distributions in a single reactor. In one embodiment of the invention, the reactor is a gas phase reactor, but a slurry phase reactor may also be employed. The catalyst system includes a main catalyst and a metallocene trim catalyst. As used herein, a "catalyst system" may include a main catalyst, a trim catalyst and optionally at least one activator. A catalyst system may also include other components, for example, supports, and is not limited to the catalyst component and/or activator alone or in combination. The catalyst system may include any suitable number of catalyst components in any combination as described herein, as well as any activator in any combination as described herein. The catalyst system may also include one or more additives commonly used in the art of olefin polymerization. For example, the catalyst system may include one or more of the following: continuity additives, flow aids and anti-static aids.

The catalyst system may include at least one main catalyst compound. The catalyst system may also include at least one catalyst compound (sometimes referred to herein as an "HMW catalyst") for producing a high molecular weight fraction of the product by polymerization, and at least one catalyst compound (sometimes referred to herein as an "LMW catalyst") for producing a low molecular weight fraction of the product by polymerization. Such catalyst systems comprising at least two catalyst compounds may produce bimodal polymer compositions.

The at least two catalyst compounds may have different hydrogen responses. By this it is meant that the change in average molecular weight of a polyethylene made by each of the catalyst compounds may be different when the $H_2/C_2$ ratio is changed. The term "high hydrogen response" may be used to define a catalyst that displays a relatively large change in the average molecular weight of polyethylene when the $H_2/C_2$ ratio is changed by a set amount. The term "low hydrogen response" may be used to define a catalyst that displays a relatively low change in average molecular weight of polyethylene when the $H_2/C_2$ ratio is changed by the same set amount.

The catalyst system may be referred to as a "bimodal catalyst system" that is, it produces a bimodal polyethylene having separate, identifiable high molecular weight and low molecular weight distributions. The term "bimodal catalyst system" includes any composition, mixture or system that includes at least two different catalyst compounds, each having the same or a different metal group but generally different ligands or catalyst structure, including a "dual catalyst." Alternatively, each different catalyst compound of the bimodal catalyst system resides on a single support particle, e.g., in which case a dual catalyst is considered to be a supported catalyst. However, the term bimodal catalyst system also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerization is conducted in the presence of the two collections of supported catalysts. Alternatively, the bimodal catalyst system includes a mixture of unsupported catalysts in slurry form.

In one embodiment of the invention, the catalyst system comprises a main catalyst system and a trim catalyst. In such cases, the main catalyst system comprises at least one catalyst compound (the "main catalyst compound") and a support, and may also contain an activator, and/or any other additives such as previously described. The main catalyst may be delivered as a slurry in a hydrocarbon diluent, such as mineral oil. The trim catalyst comprises a trim catalyst compound. This trim catalyst compound may also be present in the main catalyst system. The trim catalyst may also comprise a solvent, such as a hydrocarbon, and may also contain other additives. Using such a catalyst system, the ethylene-based polymer properties, such as the weight fraction of the high molecular weight component, can be controlled by adjusting the ratio of the trim catalyst to the main catalyst system that is employed in the polymerization reaction.

The trim catalyst compound may be a single site catalyst compound, such as, for example, a metallocene catalyst compound. In one embodiment of the invention, the trim catalyst is employed for producing a low molecular weight polymer fraction. In one embodiment of the invention, the main catalyst is employed for producing a high molecular weight polymer fraction.

The main catalyst compound may include one or more Group 15 and metal containing catalyst compounds. The Group 15 and metal containing compound generally includes a Group 3 to 14 metal atom, or a Group 3 to 7, or a Group 4 to 6, or a Group 4 metal atom bound to at least one leaving group and also bound to at least two Group 15 atoms, at least one of which is also bound to a Group 15 or 16 atom through another group.

At least one of the Group 15 atoms may be bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

The Group 15 and metal containing compound is represented by the formulae:

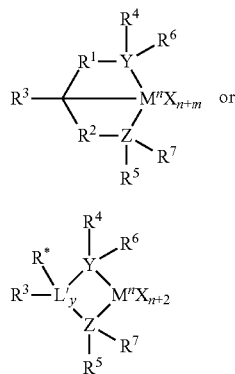

(Formula I)

(Formula II)

wherein M is a Group 3 to 12 transition metal or a Group 13 or 14 main group metal, or a Group 4, 5, or 6 metal, or a Group 4 metal, or zirconium, titanium or hafnium, and each X is independently a leaving group. X may be an anionic leaving group. X may be hydrogen, a hydrocarbyl group, a heteroatom or a halogen. X may be an alkyl, y may be 0 or 1 (when y is 0 group L' is absent), n is the oxidation state of M, which may be +3, +4, or +5, or may be +4, m is the formal charge of the YZL or the YZL' ligand, which may be 0, −1, −2 or −3, or may be −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other, $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen, $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$ where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and R* is absent, or is hydrogen, a Group 14 atom containing group, a halogen, or a heteroatom containing group.

By "formal charge of the YZL or YZL' ligand", it is meant the charge of the entire ligand absent the metal and the leaving groups X.

By "R1 and R2 may also be interconnected" it is meant that $R^1$ and $R^2$ may be directly bound to each other or may be bound to each other through other groups. By "R4 and R5 may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

$R^4$ and $R^5$ may be independently a group represented by the following formula III:

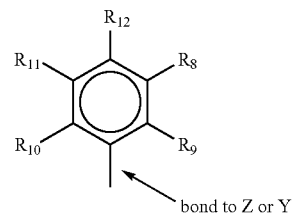

wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. $R^9$, $R^{10}$ and $R^{12}$ may be independently a methyl, ethyl, propyl or butyl group (including all isomers). In a preferred embodiment any 3 of the R groups of formula III may be methyl groups, and any 2 of the other R groups of formula III may be hydrogen. In a preferred embodiment of the invention, $R^9$, $R^{10}$ and $R^{12}$ are methyl, and $R^8$ and $R^{11}$ are hydrogen.

$R^4$ and $R^5$ may be both a group represented by the following formula IV:

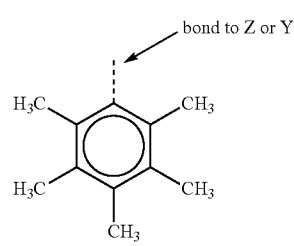

Formula IV where M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

The Group 15 and metal containing compound may be Compound 1 (also referred to as "bis(arylamido)Zr dibenzyl") represented below:

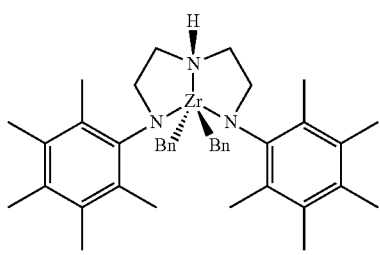

In the representation of Compound 1, "Bn" denotes a benzyl group.

Group 15 and metal containing catalyst compounds may be made by methods known in the art. In some cases, the methods disclosed in EP 0 893 454 AI, U.S. Pat. No. 5,889,128 and the references cited in U.S. Pat. No. 5,889,128 are suitable.

A preferred direct synthesis of these compounds comprises reacting the neutral ligand, (see for example YZL or YZL' of formula I or II with $M''X_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at 20 to 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

The Group 15 and metal containing compound may be made by a method comprising reacting a neutral ligand, (see for example YZL or YZL' of formula I or II) with a compound represented by the formula $M^{11}X_n$ (where M is a Group 3 to 14 metal, n is the oxidation state of M, each X is an anionic leaving group) in a non-coordinating or weakly coordinating solvent, at 20° C. or above, preferably at 20 to 100° C., then treating the mixture with an excess of an alkylating agent, then recovering the metal complex. The solvent may have a boiling point above 60° C., such as toluene, xylene, benzene, and/or hexane. The solvent may comprise ether and/or methylene chloride.

Generally, metallocene compounds may include half and full sandwich compounds having one or more ligands bonded to at least one metal atom. Typical metallocene compounds are generally described as containing one or more ligand(s) and one or more leaving group(s) bonded to at least one metal atom.

The ligands are generally represented by one or more open, acyclic, or fused ring(s) or ring system(s) or a combination thereof. These ligands, preferably the ring(s) or ring system(s) may be composed of atoms selected from Groups 13 to 16 atoms of the Periodic Table of Elements. The atoms may be selected from the group consisting of carbon, nitrogen, oxygen, silicon, sulfur, phosphorous, germanium, boron and aluminum or a combination thereof. The ring(s) or ring system(s) may be composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom may be selected from Groups 3 through 15 and the lanthanide or actinide series of the Periodic Table of Elements. The metal may be a transition metal from Groups 4 through 12, or Groups 4, 5 and 6, or the transition metal is from Group 4.

The catalyst composition may include one or more metallocene catalyst compounds represented by the formula V:

where M is a metal atom from the Periodic Table of the Elements and may be a Group 3 to 12 metal or from the lanthanide or actinide series of the Periodic Table of Elements. M may be a Group 4, 5 or 6 transition metal, or M is a Group 4 transition metal, or M is zirconium, hafnium or titanium. The ligands, $L^A$ and $L^B$, may be open, acyclic or fused ring(s) or ring system(s) and may be any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. $L^A$ and $L^B$ may be any other ligand structure capable of π-bonding to M. The atomic molecular weight of $L^A$ and $L^B$ may exceed 60 a.m.u., or may exceed 65 a.m.u. $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ ligands include but are not limited to amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M. In one alternative of Formula V only one of either $L^A$ or $L^B$ may be present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that may also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R may form a carbon sigma bond to the metal M.

Other ligands may be bonded to the metal M, such as at least one leaving group Q. Q may be a monoanionic labile ligand having a sigma-bond to M. Depending on the oxidation state of the metal, the value for n may be 0, 1 or 2 such that Formula V above represents a neutral metallocene catalyst compound.

Non-limiting examples of Q ligands may include weak bases such as amines, phosphines, ethers, carboxylates, dienes, hydrocarbyl radicals having from 1 to 20 carbon atoms, hydrides or halogens and the like or a combination thereof. Two or more Q's may form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methoxy, ethoxy, propoxy, phenoxy, bis(N-methylanilide), dimethylamide, dimethylphosphide radicals and the like.

The catalyst composition may include one or more metallocene catalyst compounds where $L^A$ and $L^B$ of Formula V are bridged to each other by at least one bridging group, A, as represented by Formula VI.

$$L^A AL^B MQ_n \qquad (VI)$$

The compounds of Formula VI are known as bridged, metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Bridging group A may contain a carbon, silicon or germanium atom, preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. The bridged, metallocene catalyst compounds of Formula IV may have two or more bridging groups A (EP 0 664 301 BI).

The metallocene catalyst compounds may be those where the R substituents on the ligands LA and LB of Formulas V and VI are substituted with the same or different number of substituents on each of the ligands. The ligands LA and LB of Formulas V and VI may be different from each other.

The main catalyst system includes a main catalyst compound represented by Formula II above, such as a compound having the formula [(2,3,4,5,6-Me$_5$C$_6$)NCH$_2$CH$_2$]$_2$NHZrBn$_2$, where 2,3,4,5,6-Me$_5$C$_6$ represents a pentamethylphenyl group, and Bn is a benzyl group. Optionally, the main catalyst system may include a second main catalyst compound that may be represented by Formula V above, such as a zirconocene dichloride compound, such as (propylcyclopentadienyl)(1,3-dimethyl-4,5,6,7-tetrahydroindenyl)zirconium dimethyl.

The ratio of the main catalyst compound to the trim catalyst compound may be in the range from 1:10 to 10:1, or from 1:1 to 8:1 or in the range from 1:1 to 6:1.

The trim catalyst may comprise a catalyst compound that may be represented by Formulas VII and VIII below; specifically, Formula VII is on the left and shows (propylcyclopentadienyl)(1,3-dimethyl-4,5,6,7-tetrahydroindenyl) zirconium dimethyl, while Formula VIII is on the right and shows (methylcyclopentadienyl)(1-methyl-4,5,6,7-tetrahydroindenyl)zirconium dimethyl.

Formulas VII and VIII:

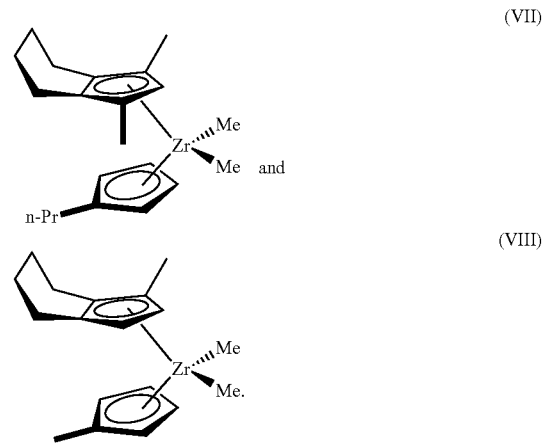

As used herein, the term "activator" may include any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds may be activated for oligomerization and/or polymerization catalysis in any manner sufficient to allow coordination or cationic oligomerization and or polymerization.

Alumoxane activators may be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and WO 94/10180.

When the activator is an alumoxane (modified or unmodified), the maximum amount of activator may be selected to be a 5000-fold molar excess Al/M over the catalyst precursor (per metal catalytic site). Alternatively or additionally the minimum amount of activator-to-catalyst-precursor may be set at a 1:1 molar ratio.

Aluminum alkyl or organoaluminum compounds that may be utilized as activators (or scavengers) include trimethylaluminum, triethylaluminum, triisobutylaluminum, tri-n-hexylaluminum, tri-n-octylaluminum and the like.

The catalyst systems may include a support material or carrier. For example, the at least one or more catalyst compounds and/or one or more activators may be deposited on, contacted with, vaporized with, bonded to, or incorporated within, adsorbed or absorbed in, or on, one or more supports or carriers. Thus, the above described catalyst compounds as well as other transition metal catalyst compounds and/or catalyst systems may be combined with one or more support materials or carriers using one of the support methods well known in the art or as described below. For example, a metallocene catalyst compound or catalyst system is in a supported form, for example, when deposited on, contacted with, or incorporated within, adsorbed or absorbed in, or on, a support or carrier.

As used herein, the terms "support" and "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, zeolites, clays or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, for example, WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in WO 99/47598; aerogels as disclosed in WO 99/48605; spherulites as disclosed in U.S. Pat. No. 5,972,510; and polymeric beads as disclosed in WO 99/50311.

The support material, such as an inorganic oxide, may have a surface area in the range of from 10 $m^2/g$ to 700 $m^2/g$, pore volume in the range of from 0.1 $cm^3/g$ to 4.0 $cm^3/g$ and average particle size in the range of from 5 microns to 500 microns. More preferably, the surface area of the support material may be in the range from 50 $m^2/g$ to 500 $m^2/g$, pore volume from 0.5 $cm^3/g$ to 3.5 $cm^3/g$ and average particle size of from 10 microns to 200 microns. Most preferably the surface area of the support material may be in the range is from 100 $m^2/g$ to 400 $m^2/g$, pore volume from 0.8 $cm^3/g$ to 3.0 $cm^3/g$ and average particle size is from 5 microns to 100 microns. The average pore size of the carrier typically has pore size in the range of from 10 Angstroms to 1,000 Angstroms, alternatively from 50 Angstroms to 500 Angstroms, and in some embodiments from 75 Angstroms to 350 Angstroms.

The catalyst compounds may be supported on the same or separate supports together with an activator, or the activator may be used in an unsupported form, or may be deposited on a support different from the supported catalyst compounds, or any combination thereof. This may be accomplished by any technique commonly used in the art.

There are various other methods in the art for supporting a polymerization catalyst compound or catalyst system. For example, the metallocene catalyst compounds may contain a polymer bound ligand as described in, for example, U.S. Pat. Nos. 5,473,202 and 5,770,755. The metallocene catalyst compounds may be spray dried as described in, for example, U.S. Pat. No. 5,648,310. The support used with the metallocene catalyst compounds may be functionalized, as described in EP 0 802 203, or at least one substituent or leaving group is selected as described in U.S. Pat. No. 5,688,880.

The polyethylene resins disclosed herein may be made by gas phase processes. The resins may be made in a single reactor. The polyethylene resins disclosed herein may also be made in a single gas phase reactor. In one embodiment of the invention, the reactor is a gas phase fluidized bed polymerization reactor.

The polyethylene may be produced using a staged gas phase reactor. Commercial polymerization systems are described in, for example, "Volume 2, Metallocene-Based Polyolefins," at pages 366-378 (John Scheirs & W. Kaminsky, eds. John Wiley & Sons, Ltd. 2000); U.S. Pat. Nos. 5,665,818; 5,677,375; and 6,472,484; and EP 0 517 868 and EP 0 794 200.

Gas phase processes may utilize a fluidized bed reactor. A fluidized bed reactor may include a reaction zone and a so-called velocity reduction zone. The reaction zone may include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream may be at a rate equal to the rate at which particulate polymer product and monomer associated therewith may be withdrawn from the reactor and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may be removed in a cyclone and/or fine filter. The gas may be passed through a heat exchanger where the heat of polymerization may be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluidized bed process may range from 30° C. or 40° C. or 50° C. to 90° C. or 100° C. or 110° C. or 120° C. or 150° C. In general, the reactor temperature may be operated at the highest temperature feasible taking into account the sintering temperature of the ethylene-based polymer product within the reactor. Regardless of the process used to make the polyolefins, e.g., bimodal polyethylene, the polymerization temperature or reaction temperature should be below the melting or "sintering" temperature of the ethylene-based polymer to be formed. Thus, the upper temperature limit may be the melting temperature of the polyolefin produced in the reactor.

Hydrogen gas may be used in olefin polymerization to control the final properties of the polyolefin, such as described in "Polypropylene Handbook," at pages 76-78 (Hanser Publishers, 1996). The amount of hydrogen in the polymerization may be expressed as a mole ratio relative to the total polymerizable monomer, for example, ethylene, or a blend of ethylene and 1-hexene or propylene. The amount of hydrogen used in the polymerization process may be an amount necessary to achieve the desired MFR or FI of the final polyolefin resin. The amount of hydrogen used in the polymerization process may also be an amount necessary to achieve a desired bimodal molecular weight distribution between the high molecular weight component and the low molecular weight component of a bimodal polyolefin.

The catalyst system may also be used to further control the properties of the polyethylene resin. For example, the amount of trim catalyst may be adjusted to modify the in-reactor ratio of the catalyst compounds of the catalyst system so as to achieve a desired flow index or flow index split. The trim catalyst may be fed directly to the reactor separately from the main catalyst compound of the catalyst system. The trim catalyst may also be mixed with the main catalyst compound of the catalyst system prior to feeding to the reactor. The trim catalyst may also be continuously mixed with the other compounds of the catalyst system and the resulting mixture continuously fed to the reactor. The trim catalyst may be continuously mixed with a supported catalyst and the resulting mixture continuously fed to the reactor. The trim catalyst may be a supported catalyst or an unsupported catalyst. Where the trim catalyst is an unsupported catalyst it may be supported 'in-line' for example by contacting with a supported catalyst prior to feeding to the reactor. The supported trim catalyst may comprise an activator that may activate the trim catalyst 'in-line' prior to feeding to the reactor.

The trim catalyst may be provided in a form that is the same or different to that of the main catalyst compounds of the catalyst system. However, upon activation by a suitable activator the active catalyst species resulting from the trim catalyst may be the same as the active catalyst species resulting from one of the at least two different catalyst compounds of the catalyst. The skilled person would appreciate that, for example, a metallocene dihalide and a metallocene dialkyl may yield the same active catalyst species upon treatment with a suitable activator. For example, a metallocene such as (propylcyclopentadienyl)(1,3-dimethyl-4,5,6,7-tetrahydroindenyl)zirconium(X)$_2$ (where X can be a halide, alkyl, or any other leaving group as previously described) may be used in the dichloride form to make a supported catalyst. When used as a trim catalyst it may be provided in the dialkyl form such as the dimethyl form. This may be advantageous in regard to solubility where dialkyl forms may have enhanced solubility in, for example, aliphatic hydrocarbons.

The catalyst system may include a silica-supported catalyst system including a Group 15 and metal containing catalyst compound and a metallocene catalyst compound. The catalyst system may also include a trim catalyst comprising a metallocene catalyst compound. An activator or co-catalyst may also be provided on the support, such as MAO.

The catalyst system may comprise at least one, or two or more, catalyst compound(s) comprising a titanium, a zirconium, or a hafnium atom. The catalyst system may comprise at least one, or two or more, of:
- (pentamethylcyclopentadienyl) (propylcyclopentadienyl) MX$_2$,
- (tetramethylcyclopentadienyl) (propylcyclopentadienyl) MX$_2$,
- (tetramethylcyclopentadienyl)(butylcyclopentadienyl)MX$_2$,
- (n-propylcyclopentadienyl)(1,3-dimethyl-4,5,6,7-tetrahydroindenyl) MX$_2$
- (methylcyclopentadienyl)(1,3-dimethyl-4,5,6,7-tetrahydroindenyl)MX$_2$
- (cyclopentadienyl)(1,3-dimethyl-4,5,6,7-tetrahydroindenyl) MX$_2$
- (methylcyclopentadienyl)(1-methyl-4,5,6,7-tetrahydroindenyl)MX$_2$
- Me$_2$Si(indenyl)$_2$MX$_2$,
- Me$_2$Si(tetrahydroindenyl)$_2$MX$_2$,
- (n-propyl cyclopentadienyl)$_2$MX$_2$,
- (n-butyl cyclopentadienyl)$_2$MX$_2$,
- (1-methyl, 3-butyl cyclopentadienyl)$_2$MX$_2$,
- HN(CH$_2$CH$_2$N(2,4,6-Me3phenyl))$_2$MX$_2$,
- HN(CH$_2$CH$_2$N(2,3,4,5,6-Me$_5$phenyl))$_2$MX$_2$,
- (n-propylcyclopentadienyl) (tetramethylcyclopentadienyl) MX$_2$,
- (n-butylcyclopentadienyl)$_2$MX$_2$,
- (n-propylcyclopentadienyl)$_2$MX$_2$, and mixtures thereof, wherein M is Zr or Hf, and X is selected from F, Cl, Br, I, Me, benzyl, CH$_2$SiMe$_3$, and C$_1$ to C$_5$ alkyls or alkenyls.

The mole ratio of hydrogen to total monomer (H$_2$:monomer) may be in a range from greater than 0.0001, greater than 0.0005, or greater than 0.001, and less than 10, less than 5, less than 3, or less than 0.10, wherein a desirable range may include any combination of any upper mole ratio limit with any lower mole ratio limit described herein. Expressed another way, the amount of hydrogen in the reactor at any time may range up to 5,000 ppm, up to 4,000 ppm, or up to 3,000 ppm, or between 50 ppm and 5,000 ppm, or between 500 ppm and 2,000 ppm.

The one or more reactor pressures in a gas phase process (either single stage or two or more stages) may vary from 690 kPa (100 psig) to 3,448 kPa (500 psig). For example, they may range from 1,379 kPa (200 psig) to 2,759 kPa (400 psig) or from 1,724 kPa (250 psig) to 2,414 kPa (350 psig).

The catalyst system may be used to produce a bimodal polyethylene resin having a flow index in the range from 5 to 60 dg/min and a density of greater than or equal to 0.949 g/cc, such as in the range from 0.953 to 0.96 g/cc. When used to produce such a bimodal polyethylene resin in a gas phase reactor, the reactor conditions may include a temperature in the range from 100° C. to 120° C., such as from 105° C. to 110° C., and a hydrogen to ethylene ratio range from 0.0010 to 0.0020, on a molar basis. When the desired swell is high, the hydrogen to ethylene ratio may be controlled to be less than 0.00140, on a molar basis; when the desired swell is low, the hydrogen to ethylene ratio may be controlled to be greater than 0.00145 on a molar basis, such as in the range from 0.00145 to 0.00155, on a molar basis.

The polyethylene resins may be used in a wide variety of products and end-use applications. The polyethylene resins may also be blended and/or coextruded with any other polymer. Non-limiting examples of other polymers include linear low density polyethylenes, elastomers, plastomers, high pressure low density polyethylene, high density polyethylenes, polypropylenes and the like. The resins described herein may be used to produce blow molded components or products, among other various end uses. The polyethylene resins and blends thereof may be useful in forming operations such as film, sheet, and fiber extrusion and coextrusion as well as blow molding, injection molding and rotary molding. Films may include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include melt spinning, solution spinning and melt blown fiber operations for use in woven or non-woven form to make filters, diaper fabrics, medical garments, geotextiles, etc. Extruded articles may include medical tubing, wire and cable coatings, pipe, geomembranes, and pond liners. Molded articles may include single and multi-layered constructions in the form of bottles, tanks, large hollow articles, rigid food containers and toys, etc.

Specific Embodiments of the Invention

Compounding. Granular resin, as produced by the gas phase reactor, is mixed together with 1000 ppm each of Irganox 1010 (BASF) and Irgafos 168 (BASF) in a ribbon blender, and then compounded on a ZSK-40 twin screw extruder, which produces strand cut pellets.

Compounded Resin Properties

Flow Indices, I2, I5 and I21, are measured according to ASTM D1238 at 190° C. and 2.16 kg, 5 kg, and 21.6 kg, respectively.

Density is measured using ASTM D792.

Stiffness is characterized by measuring the Secant Modulus at 2% strain at a test speed of 0.5 in/min (13 mm/min) per ASTM D 790-99 Method B.

Tensile properties are measured according to ASTM D638 using a single head machine at a test speed of 2 in/min (52 mm/min).

Environmental Stress Crack Resistance (ESCR) is measured using the Bent Strip method, as described in ASTM D1693, Method B (10% Igepal).

Specimens for Secant Modulus, Tensile properties and ESCR testing are die cut from compression molded plaques made according to ASTM D-4703-00 Annex A1 Procedure C.

Toughness is measured by Charpy (notched) impact resistance at -40° C. via ISO 179.

GPC Chromatographic Conditions. The chromatographic system consists of a PolymerChar GPC-IR (Valencia, Spain) high temperature GPC chromatograph equipped an IR5 multi-fixed wavelength infra-red detector. The sample dissolution oven is set at 160° C. and the column compartment is operated at 150° C. The columns are 4 Agilent Technologies "Mixed A" 30 cm 20-micron columns. The chromatographic solvent is 1,2,4 trichlorobenzene and contains 200 ppm of butylated hydroxytoluene (BHT). The solvent source is nitrogen sparged. The injection volume is 200 microliters and the flow rate is 1.0 ml/minute. Polyethylene samples are made at 2 mg/ml using the GPC-IR automated solvent addition with a dissolution time of 3 hours.

Conventional GPC Measurements. For conventional molecular weight measurements, the GPC column set is calibrated with 21 narrow molecular weight distribution polystyrene standards with molecular weights ranging from 580 to 8,400,000 and are arranged in 6 "cocktail" mixtures with at least a decade of separation between individual molecular weights. The standards are purchased from Agilent Technologies. The polystyrene standards are made at 0.025 grams in 50 milliliters of solvent for molecular weights equal to or greater than 1,000,000, and 0.05 grams in 50 milliliters of solvent for molecular weights less than 1,000,000. The polystyrene standards are pre-dissolved at 80° C. with gentle agitation for 30 minutes. The polystyrene standard peak molecular weights are converted to polyethylene molecular weights using the following equation (as described in Williams and Ward, *J. Polym. Sci.*, Polym. Let., 6, 621 (1968)): Mpolyethylene=A×(Mpolystyrene)B where M is the molecular weight, A has a value of 0.4316 for conventional GPC results and approximately 0.41 for triple detector backbone Mw calculations (referencing an A value that yields 52,000 Mw for NBS 1475 linear homopolymer poly) and B is equal to 1.0. A third order polynomial is used to fit the respective polyethylene-equivalent calibration points. Molecular weight distribution and molecular weight moment calculations are calculated using PolymerChar "GPC One" software.

Capillary (Extrudate) Swell Measurements. Capillary, or extrudate, swell testing is used to evaluate the average extrudate swell of a polymer strand leaving the die of an extruder, in a range of time representative of a manufacturing process, such as blow molding process. A strand of polymer is produced by a piston-driven capillary rheometer (Gottfert Rheograph 2003 equipped with a 12 mm diameter barrel and a 1 mm diameter circular die of length 10 mm, with a 90° entrance angle) at shear rates of either 300 s−1 or 1000 s−1 and at a temperature of 190° C. The volumetric flow rate is kept constant. The strand is cut at a distance of 4 cm from the die exit, and the timer is started. When the strand reaches a total length of 27 cm (namely an incremental length of 23 cm after the timer started), the timer is stopped. High swell materials produce thicker extrudate whose length grows more slowly than that of lower swell materials. The recorded time for the strand to reach the incremental length of 23 cm relates to the extrudate swell. The measurement is repeated five times, to account for measurement variability, and the average result is reported. The extrudate swell is herein reported as the time, t1000 seconds, required for the extrudate to cover the distance of 23 cm when extruded at a shear rate of 1000 1/s.

Melt Strength Measurements. Melt strength is measured at 190° C. using a Gottfert Rheotens™ connected in series to a Rheo-Tester™ 2000 capillary rheometer. A capillary die of 30 mm length, 2 mm diameter and 180° entrance angle is used to extrude the resin. The sample is allowed to melt in the rheometer barrel for ten minutes, followed by extrusion through the die at a shear rate of ca. 38.2 s−1. As the sample strand extrudes from the die, it is taken up by a pair of counter rotating wheels that turn with increasing velocity (acceleration of 2.4 mm/s$^2$) to draw down the strand. The resistance of the material against drawdown is reported in a plot of force F (cN) versus drawdown velocity v (mm/s). The initial velocity of the wheels is adjusted to equal the velocity of the strand so that a starting force of zero is measured. The test terminates with rupture of the strand. Melt strength is reported as the average of the drawdown force values recorded between 50-100 mm/s or 40-80 mm/s.

Example 1A—Bimodal Catalyst System 1 Preparation

Bimodal polyethylene is produced using gas phase polymerization in a single-reactor with a catalyst system that includes spray-dried bis(2-pentamethylphenylamido)ethyl) zirconium dibenzyl, methylalumoxane (MAO) and CAB-O-SIL TS-610 brand fumed silica in mineral oil slurry as a main catalyst (Catalyst 1A). Also fed to the reactor is a trim catalyst that is made as a mixture of 0.04 wt % (methylcyclopentadienyl)(1-methyl-tetrahydroindenyl)zirconium dimethyl in isopentane. The trim catalyst (Catalyst 1B) is added during the polymerization process as a catalyst trim feed in line with the main catalyst slurry in order to adjust the flow index properties of the bimodal polyethylene.

Example 1B—Polymerization Process for Polymer 1

Bimodal polyethylene is produced in a single gas phase polymerization reactor using the catalyst system of Example 1A. The gas phase reactor employed is a continuous fluidized bed reactor. For the experimental run, catalyst 1A and catalyst 1B are cofed inline through a stainless steel 1/8" injection tube into the fluidized bed reactor. The reactor gas composition is controlled by metering the feeds to the reactor at a rate sufficient to maintain 220 psi ethylene partial pressure, 0.0030 n-hexene/C2 molar ratio, 0.0035 H2/C2 molar ratio and 11.6 mol % isopentane. The reactor temperature is 95° C. and the reactor residence time is ca. 3.1 hours. The reactor bed weight is maintained by discharging granular resin into a discharge tank where it is purged with nitrogen before being dumped into a fiberpack that is again purged with a steam/nitrogen mixture. The flow index of the ethylene-based polymer is controlled by adjusting the ratio of the Catalyst 1B feed to the Catalyst 1A feed, where higher ratios raise the flow index of the resultant polymer. The reactor process conditions are shown in Table 1 while the properties of the ethylene-based polymer (compounded resin) are shown in Table 2.

Example 2A—Bimodal Catalyst System 2 Preparation

Bimodal polyethylene is produced using gas phase polymerization in a single-reactor with a catalyst system that includes spray-dried bis(2-pentamethylphenylamido)ethyl) zirconium dibenzyl, (propylcyclopentadienyl)(1,3-dimethyl-tetrahydroindenyl)zirconium dimethyl, methylalumoxane (MAO) and CAB-O-SIL TS-610 brand fumed silica in mineral oil slurry as a main catalyst (Catalyst 2A). Also fed to the reactor is a trim catalyst (Catalyst 2B) that is made as a mixture of 0.04 wt % (propylcyclopentadienyl)(1,3-dimethyl-tetrahydroindenyl)zirconium dimethyl in isopentane. The trim catalyst is added during the polymerization process as a catalyst trim feed in line with the slurry catalyst in order to adjust the flow index properties of the bimodal polyethylene.

Example 2B—Polymerization Process for Polymer 2

Example 1B is repeated except as noted. For the experimental run, Catalyst 2A and Catalyst 2B are cofed inline through a stainless steel 1/8" injection tube into the fluidized bed reactor. The reactor gas composition is controlled by metering the feeds to reactor at a rate sufficient to maintain 0.0018 n-hexene/C2 molar ratio, 0.0011 H2/C2 molar ratio and 10.7 mol % isopentane. The reactor temperature is 105° C. and the reactor residence time is ca. 3.4 hours. The reactor process conditions are shown in Table 1 while the properties of the ethylene-based polymer (compounded resin) are shown in Table 2.

Comparative Example 1 (not an embodiment of the invention). For the comparative experiment, the catalyst PRODIGY™ BMC-300, commercially available from Univation Technologies (Houston, Tex.) is fed to a commercial scale UNIPOL™ polyethylene reactor via a 1/4" injection tube. UT-TR-300, a metallocene trim cofeed commercially available from Univation Technologies (Houston, Tex.) is fed into the same 1/4" injection tube at a rate sufficient to provide the desired resin flow index. The reactor gas composition is controlled by metering the feeds to the reactor at a rate sufficient to maintain 220 psi ethylene partial pressure, 0.0011 n-hexene/C2 molar ratio, 0.0013 H2/C2 molar ratio and 14.9 mol % isopentane. CA-300, an additive commercially available from Univation Technologies (Houston, Tex.) is separately fed to the reactor to maintain a concentration of about 45 ppmw based on ethylene feed rate to the reactor. The reactor temperature is nominally 105° C. and the reactor residence time is ca. 3.45 hours. The reactor bed weight is maintained by discharging granular resin into discharge tanks where it is purged with nitrogen before being conveyed to a product purge bin for steam deactivation of residual catalyst components and further purging to remove residual hydrocarbons. The reactor process conditions are shown in Table 1 while the properties of the ethylene-based polymer (compounded resin) are shown in Table 2.

TABLE 1

Reactor Process Conditions

| | Example # | | |
|---|---|---|---|
| | 1 | 2 | C. E. 1 |
| Reactor Bed Temperature, ° C. | 95.0 | 105.0 | 105.2 |
| Reactor Total Pressure, psig | 350.2 | 349.2 | 268.4 |
| Bed Weight, lbs | 113.8 | 106.5 | 32,950 |
| Bed Height, feet | 6.3 | 6.6 | 39 |
| Reactor Gas Velocity, ft/s | 1.45 | 1.88 | 1.99 |
| Ethylene Partial Pressure, psi | 220.2 | 220.1 | 219.9 |
| $C_6/C_2$ molar ratio | 0.0030 | 0.0018 | 0.0011 |
| $H_2/C_2$ molar ratio | 0.0035 | 0.0011 | 0.0013 |
| Isopentane mol % | 11.6 | 10.7 | 14.9 |

TABLE 2

Compounded Resin Properties

| | Example 1 | Example 2 | C.E. 1 |
|---|---|---|---|
| I2 (g/10 min) | 0.20 | 0.15 | 0.13 |
| I21 (g/10 min) | 33.4 | 30.7 | 29.8 |
| I5 (g/10 min) | 1.01 | 1.05 | 0.89 |
| I21/I2 | 163.6 | 208.6 | 234.3 |
| I21/I5 | 33.2 | 29.2 | 33.4 |
| Density (g/cc) | 0.9591 | 0.9592 | 0.9590 |
| GPC Mn (g/mol) | 7799 | 11585 | 11835 |
| GPC Mw (g/mol) | 241878 | 319109 | 325706 |

TABLE 2-continued

Compounded Resin Properties

|  | Example 1 | Example 2 | C.E. 1 |
|---|---|---|---|
| GPC Mw/Mn | 31.0 | 27.6 | 27.5 |
| GPC Mz (g/mol) | 2283564 | 3474930 | 3569145 |
| GPC Mz/Mw | 9.4 | 10.9 | 11.0 |
| GPC Mz + 1 | 6119634 | 7907921 | 8115077 |
| Split (%) | 41.2 | 23.6 | 27.0 |
| LMW Mn | 5143 | 9358 | 8908 |
| LMW Mw | 19657 | 42216 | 35208 |
| LMW Mz | 48367 | 84300 | 73684 |
| HMW Mn | 104516 | 337941 | 253442 |
| HMW Mw | 556898 | 1226693 | 1120506 |
| HMW Mz | 2351773 | 3989019 | 4016244 |
| HMW Mz/Mw | 4.2 | 3.3 | 3.6 |
| ESCR (10%) $F_{50}$ (hr) | >1000 | 662 | 168 |
| Secant Modulus @ 2% (ksi) | 163.0 | 165.9 | 173.4 |
| Strain @ Break (%) | 708 | 700 | 746 |
| Strain @ Yield (%) | 9.0 | 8.7 | 8.5 |
| Stress @ Break (psi) | 4108 | 3869 | 4270 |
| Stress @ Yield (psi) | 4337 | 4319 | 4428 |
| Charpy −40 Deg C. (kJ/m^2) | 7.2 | 8.3 | 7.2 |
| Capillary Swell t1000 (sec) | 6.1 | 7.7 | 7.0 |
| Melt Strength (cN) | 8.5 | 10.6 | 10.5 |

The molecular weight distribution of each polymer as determined by GPC is shown in FIG. 1.

What is claimed is:

1. An ethylene-based polymer comprising a higher molecular weight component (HMW component) and a lower molecular weight component (LMW component), the ethylene-based polymer being characterized by a density greater than or equal to 0.949 g/cm³, measured according to ASTM D792, a ratio of Mw/Mn of from 25 to 35, an Environmental Stress Crack Resistance (ESCR) of at least 600 hr. measured according to ASTM D-1693, Condition B octylphenoxypolyethoxyethanol 10%, and by a bimodal weight average molecular weight distribution with a local minimum in a range of log (molecular weight) 4 to 6 between a peak representing the HMW component and a peak representing the LMW component, as determined by Gel Permeation Chromatography (GPC) analysis, of the ethylene-based polymer, wherein the Mz/Mw of the high molecular weight component is from 3.3 to 5.

2. The ethylene-based polymer of claim 1 wherein the ethylene-based polymer has a split, and the split of the ethylene-based polymer is from 20 wt % to 45 wt %.

3. The ethylene-based polymer of claim 1 wherein the ethylene-based polymer is a polyethylene resin and has an ESCR of at least 650 hr measured according to ASTM D-1693 at F50.

4. The ethylene-based polymer of claim 1 wherein the ethylene-based polymer has a melt flow ratio I21/I5 in the range from 15 to 45 measured according to ASTM D1238 with I21 and I5 measured at 190° C. and 21.6 kg or 5.0 kg weight respectively, and a flow index I21 in the range from 15 to 61 g/10 min.

5. The ethylene-based polymer of claim 1 wherein the ethylene-based polymer has a Capillary Swell t1000 of at least 6 seconds as measured by the extrudate covering a distance of 23 cm when extruded at a shear rate of 1000 1/s, with a 12 mm diameter barrel and a 1 mm diameter circular die of length 10 mm, with a 90° C. entrance angle.

6. A process for copolymerizing ethylene and one or more alpha-olefins in a single olefin polymerization reactor utilizing a catalyst system, an activator and a support in order to produce an ethylene-based polymer, the process comprising combining ethylene and at least one alpha-olefin comonomer in the presence of a catalyst system, an activator and a support, wherein the catalyst system comprises a main catalyst and a trim catalyst, wherein the main catalyst comprises bis(2-pentamethylphenylamido)ethyl)zirconium dibenzyl, and wherein the trim catalyst comprises at least one of (propylcyclopentadienyl)(1,3-dimethyl-tetrahydroindenyl)zirconium dimethyl and (methylcyclopentadienyl)(1-methyl-tetrahydroindenyl)zirconium dimethyl, wherein the ethylene-based polymer that is produced is an ethylene-based polymer having a higher molecular weight component (HMW component) and a lower molecular weight component (LMW component) and a bimodal molecular weight distribution, the ethylene-based polymer being characterized by a density greater than or equal to 0.949 g/cm³, measured according to ASTM D792, a ratio of Mw/Mn of from 25 to 35, an ESCR of at least 600 hr. measured according to ASTM D-1693 at F50, Condition B octylphenoxypolyethoxyethanol 10%, and by a bimodal weight average molecular weight distribution with a local minimum in a range of log (molecular weight) 4 to 6 between a peak representing the maximum of the HMW component and a peak representing the maximum of the LMW component, as determined by Gel Permeation Chromatography (GPC) analysis, of the ethylene-based polymer, and wherein the Mz/Mw of the high molecular weight component is from 3.3 to 5.

7. An article manufactured using the ethylene-based polymer of claim 1.

8. The article of claim 7 wherein the article is prepared by blow molding.

* * * * *